US012747833B2

(12) United States Patent
Ogumerem et al.

(10) Patent No.: US 12,747,833 B2
(45) Date of Patent: Sep. 29, 2026

(54) SMART HYDROGEN STORAGE PROTOCOL

(71) Applicant: The Texas A&M University System, College Station, TX (US)

(72) Inventors: Gerald S. Ogumerem, Lake Jackson, TX (US); Efstratios N. Pistikopoulos, College Station, TX (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 21 days.

(21) Appl. No.: 18/920,700

(22) Filed: Oct. 18, 2024

(65) Prior Publication Data

US 2025/0043918 A1 Feb. 6, 2025

Related U.S. Application Data

(63) Continuation of application No. 17/605,226, filed as application No. PCT/US2020/031905 on May 7, 2020, now Pat. No. 12,352,388.

(Continued)

(51) Int. Cl.
*F17C 11/00* (2006.01)

(52) U.S. Cl.
CPC ...... *F17C 11/005* (2013.01); *F17C 2221/012* (2013.01); *F17C 2250/032* (2013.01); *F17C 2250/04* (2013.01); *Y02E 60/50* (2013.01)

(58) Field of Classification Search
CPC .............. F17C 11/005; F17C 2221/012; F17C 2250/032; F17C 2250/04; Y02E 60/50
See application file for complete search history.

(56) References Cited

U.S. PATENT DOCUMENTS 6,584,825 B2 * 7/2003 Pratt ......................... G01N 7/04 73/23.31
7,059,364 B2 * 6/2006 Kountz ...................... F17C 9/02 141/82

(Continued)

FOREIGN PATENT DOCUMENTS

DE 102010040451 A1 * 3/2012 ............ H01M 10/48
DK 179295 B1 * 4/2018 ............ F17C 13/025
EP 2634136 A1 9/2013

OTHER PUBLICATIONS

PCT/US2020/031905 International Search Report and Written Opinion dated Oct. 1, 2020 (31 p.).

(Continued)

*Primary Examiner* — Nicolas A Arnett
(74) *Attorney, Agent, or Firm* — CONLEY ROSE, P.C.

(57) ABSTRACT

A metal hydride storage system (MHSS) and a method for refueling the MHSS includes obtaining a parameter vector comprising a first state of a metal hydride storage system (MHSS), and a measurable output of the MHSS; sending the parameter vector to a control algorithm, wherein the control algorithm includes a first data structure and a second data structure, wherein the first data structure corresponds to a plurality of critical regions, wherein the second data structure corresponds to a plurality of piecewise affine functions, wherein the affine functions corresponds to a control action; searching the first data structure with the parameter vector; selecting a critical region based on searching the first data structure; selecting, from the second data structure, a piecewise affine function corresponding to the selected critical region; and calculating a control action based on the affine function, where the control action comprises controlling at least one controlled parameter.

20 Claims, 9 Drawing Sheets

Related U.S. Application Data

(60) Provisional application No. 62/845,185, filed on May 8, 2019.

(56) References Cited

U.S. PATENT DOCUMENTS

| | | | | |
|---|---|---|---|---|
| 7,433,743 | B2 * | 10/2008 | Pistikopoulos | G05B 13/048 700/89 |
| 7,690,208 | B2 * | 4/2010 | Immel | H01M 8/04216 62/48.1 |
| 9,063,867 | B2 * | 6/2015 | Kwak | H03H 21/0012 |
| 9,806,363 | B2 * | 10/2017 | Kim | H01M 8/04992 |
| 2003/0029224 | A1 * | 2/2003 | Pratt | F17C 11/005 73/23.2 |
| 2008/0154558 | A1 * | 6/2008 | Zhou | H01M 8/04305 703/2 |
| 2014/0203813 | A1 * | 7/2014 | Driemeyer-Franco | G01R 31/367 324/434 |
| 2015/0184804 | A1 * | 7/2015 | Handa | F17C 5/06 141/1 |
| 2018/0335181 | A1 * | 11/2018 | Sinding | F17C 5/04 |
| 2019/0153985 | A1 * | 5/2019 | Handa | B60L 58/33 |
| 2021/0167407 | A1 * | 6/2021 | Kancsár | H01M 8/04395 |
| 2024/0151356 | A1 * | 5/2024 | Gambone | B60L 50/71 |

OTHER PUBLICATIONS

Li, Mengxiao et al., "Review on the Research of Hydrogen Storage System Fast Refueling in Fuel Cell Vehicle," International Journal of Hydrogen Energy, Elsevier, 2019, 44 (21), pp. 10677-10693 (18 p.).

Reddi, Krishna et al., "Impact of Hydrogen SAE J2601 Fueling Methods on Fueling Time of Light-Duty Fuel Cell Electric Vehicles," International Journal of Hydrogen Energy, vol. 42 (2017), pp. 16675-16685 (11 p.).

Pistikopoulos, Efstratios N. et al., "PAROC—An Integrated Framework and Software Platform for the Optimisation and Advanced Model-Based Control of Process Systems," Chemical Engineering Science, vol. 136 (2015) pp. 115-138 (24 p.).

Restriction Requirement dated Jun. 13, 2024, for U.S. Appl. No. 17/605,226 (8 p.).

Response to Restriction Requirement dated Jun. 13, 2024, for U.S. Appl. No. 17/605,226; Response filed Jul. 23, 2024 (8 p.).

* cited by examiner

SMART HYDROGEN STORAGE PROTOCOL

CROSS-REFERENCE TO RELATED APPLICATIONS

This application is a continuation application of patent application Ser. No. 17/605,226 filed Oct. 20, 2021, and entitled "Smart Hydrogen Storage Protocol," which is a 35 U.S.C. § 371 national stage application of PCT/US2020/031905 filed May 7, 2020, and entitled "Smart Hydrogen Storage Protocol," and which claims the benefit of U.S. provisional patent application Ser. No. 62/845,185 filed May 8, 2019, and entitled "Smart Hydrogen Storage Protocol." Each of the afore-mentioned applications is hereby incorporated herein by reference in its entirety for all purposes.

STATEMENT REGARDING FEDERALLY SPONSORED RESEARCH OR DEVELOPMENT

Not Applicable.

BACKGROUND

Hydrogen fuel has the highest energy per mass of any fuel when used in a fuel cell. In general, a hydrogen fuel cell is an electrochemical cell that converts chemical energy of hydrogen and an oxidizing agent (often oxygen) into electricity. In the automotive industry, there are three main onboard hydrogen storage options that can be used on a hydrogen fuel cell electric vehicle (FCEV): compressed hydrogen gas storage, liquid hydrogen storage, and solid hydrogen storage as metal hydride storage. In the automotive industry, the prevalent method has been hydrogen gas storage via an onboard hydrogen canister.

The operating temperature during hydrogen gas refueling is a key parameter for consideration in on-board hydrogen storage options. For the compressed hydrogen gas storage method, storing sufficient hydrogen in an on-board hydrogen gas canister/cylinder of the FCEV vehicle requires a hydrogen density that necessitates a high operating refilling pressure. The Department of Energy (DOE) has set targets for on-board hydrogen storage, which include limits on the operating temperature and pre refilling pressure of the hydrogen storage system, and refueling rates comparable to gasoline refueling rates. Due to the thermodynamic properties of hydrogen under compression, storing hydrogen gas in a hydrogen storage canister, which is exothermic, increases the operating temperature of the hydrogen as pressurized hydrogen gas is pumped from a hydrogen gas station into a larger volume storage canister in a vehicle. Further, a fast refueling operation by a hydrogen refueling system causes a rapid temperature rise as more hydrogen gas is stored in an onboard hydrogen tank of a FCEV. This refueling operation can increase the possibility of a temperature runaway as more hydrogen is delivered to the onboard hydrogen gas canister. The materials used to build the compressed hydrogen canister have a high strength-to-weight ratio, which enables the canister to withstand high refilling pressures during refueling. However, these materials degrade when continuously exposed to cyclical temperatures from 85 degree Celsius (deg. C.) to −40 deg. C. during hydriding or filling the metal hydride with hydrogen and dehydriding or discharging hydrogen from the metal hydride. These issues are exacerbated by the fast refill requirements mandated by the Department of Energy (DOE) for storing hydrogen a fuel cell electric vehicle (FCEV) that have to match fast refilling requirements for storing gasoline in an internal combustion engine vehicle. In particular, a fast filling operation requires increased refilling pressures that may result in high temperatures, hot spots, and temperature runway, Hydrogen storage as metal hydride in hydrogen fuel cells is still in development. During the process of storing or filling hydrogen gas in metal alloys such as metal hydrides (hydriding) in a hydrogen gas canister generates heat and a corresponding increase in temperature. The amount of heat and subsequent increase in temperature can be controlled by the refilling pressure of the hydrogen gas and the ambient temperature of the environment. As the heat that is generated is based on a reaction of the hydrogen atoms with the metal alloy during hydriding, this increase in temperature follows Van't Hoff's equation. However, storing hydrogen follows an inverse Joule Thomson effect in that as hydrogen expands, it warms up. As such, conventional solutions for metal hydrides use cooling jackets around the hydrogen gas canister to remove the heat. However, removing this heat is a challenge due to the poor thermal conductivity of metal hydrides. Another conventional solution reduces the refilling pressure of hydrogen gas, which can control the heat that is generated. However, reducing the refilling pressure also increases the time for hydriding the metal alloy, which can compromise the fast refilling requirements of the DOE.

BRIEF SUMMARY OF THE DISCLOSURE

In an embodiment, a method for refueling a metal hydride storage system includes obtaining a parameter vector comprising first data and second data in a first sampling time period, where the first data corresponds to a first state of the metal hydride storage system and the second data corresponds to an output of the metal hydride storage system. In embodiments, the output comprises a real-time temperature and a real-time pressure of the metal hydride storage system, and the first state comprises a state of charge of the metal hydride storage system. The method also includes obtaining a first data structure and a second data structure, where the first data structure corresponds to a plurality of critical regions, where the second data structure corresponds to a plurality of piecewise affine functions, and where each of the affine functions corresponds to a control action for each of the critical regions. The method also includes searching the first data structure with the parameter vector, selecting a critical region of the critical regions based on searching the first data structure with the parameter vector. The critical region corresponds to the parameter vector. The method further includes selecting, from the second data structure, a piecewise affine function corresponding to the selected critical region based on selecting the critical region, obtaining a control action based on the affine function, where the control action comprises controlling at least one controlled parameter, and sending the control action to an actuator for controlling a parameter of the actuator. In embodiments, the method further comprises maintaining the control when the control action indicates an optimal refilling profile for the metal hydride storage system. In embodiments, the method includes sending the control action to a pressure controller, and controlling a refilling pressure of hydrogen that is sent to the metal hydride storage system. In embodiments, the method further comprises estimating the state of charge using a lookup table. In embodiments, the method further comprises obtaining a second parameter vector in a later sampling time period, where the second parameter vector further comprises the control action. In embodiments, the method further comprises iteratively obtaining a temperature of the metal hydride storage system while the output has a positive pressure. In embodiments, the method further comprises obtaining the parameter vector after coupling the metal hydride storage system to a hydrogen gas supply.

In an embodiment, a controller for controlling refueling a metal hydride storage system comprises a processor; a data acquisition system coupled to the processor and configured to receive sensor data of the metal hydride storage system, where the metal hydride storage system is communicatively coupled to the data acquisition system, and generate first data corresponding to a state of the hydrogen storage unit; a soft sensor system communicatively coupled to the data acquisition system and configured to generate second data corresponding to a pseudo state of the metal hydride storage system; a parameter vector generator coupled to the data acquisition system, and the soft sensor system and configured to generate a parameter vector based on the first data and on the second data; and a multi-parametric model predictive control unit communicatively coupled to the parameter vector generator and configured to generate a control action using the parameter vector; and send the control action to the metal hydride storage system. In embodiments, the controller comprises a memory configured to store a first data structure and a second data structure, where the first data structure corresponds to a plurality of critical regions, where the second data structure corresponds to a plurality of piecewise affine functions, and where each of the affine functions corresponds to a control action for each of the critical regions. In embodiments, the multi-parametric model predictive control unit is further configured to search the first data structure with the parameter vector; select a critical region of the critical regions based on searching the first data structure with the parameter vector, wherein the critical region corresponds to the parameter vector; select, from the second data structure, a piecewise affine function corresponding to the selected critical region; and obtain the control action based on the affine function. In embodiments, the data acquisition system is further configured to receive the sensor data of the MHSS while the MHSS has a positive pressure.

In an embodiment, a controller for refueling a metal hydride storage system comprises a memory storing instructions, and a processor coupled to the memory and configured to execute the instructions that cause the processor to obtain a parameter vector comprising first data and second data in a first sampling time period, wherein the first data corresponds to a first state of the metal hydride storage system, and wherein the second data corresponds to an output of the metal hydride storage system; obtain a first data structure and a second data structure, wherein the first data structure corresponds to a plurality of critical regions, wherein the second data structure corresponds to a plurality of piecewise affine functions, wherein each of the affine functions corresponds to a control action for each of the critical regions; search the first data structure with the parameter vector; select a critical region of the critical regions based on searching the first data structure with the parameter vector, wherein the critical region corresponds to the parameter vector; select, from the second data structure, a piecewise affine function corresponding to the selected critical region based on selecting the critical region; obtain a control action based on the affine function, wherein the control action comprises controlling at least one controlled parameter; and send the control action to an actuator for controlling a parameter of the actuator. In embodiments, the instructions further cause the processor to send the control action to a pressure controller, and control a refilling pressure of hydrogen that is sent to the metal hydride storage system. In embodiments, the output comprises a real-time temperature and a real-time pressure of the metal hydride storage system. In embodiments, the first state comprises a state of charge of the metal hydride storage system, and the instructions cause the processor to estimate the state of charge using a lookup table. In embodiments, the instructions further cause the processor to obtain a second parameter vector in a later sampling time period, wherein the second parameter vector further comprises the control action. In embodiments, the instructions further cause the processor to maintain the control when the control action indicates an optimal refilling profile for the metal hydride storage system. In embodiments, the instructions further cause the processor to iteratively obtain a temperature of the metal hydride storage system while the output has a positive pressure. In embodiments, the instructions further cause the processor to obtain the parameter vector after coupling the metal hydride storage system to a hydrogen gas supply.

Embodiments described herein comprise a combination of features and advantages intended to address various shortcomings associated with certain prior devices and systems. The foregoing has outlined rather broadly the features and technical advantages of the disclosure in order that the detailed description of the disclosure that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the disclosure. It should also be realized by those skilled in the art that such equivalent constructions do not depart from the spirit and scope of the disclosure as set forth in the appended claims.

BRIEF DESCRIPTION OF THE DRAWINGS

For a detailed description of the embodiments of the disclosure, reference will now be made to the accompanying drawings in which.

DETAILED DESCRIPTION OF THE EMBODIMENTS

Figure 1:
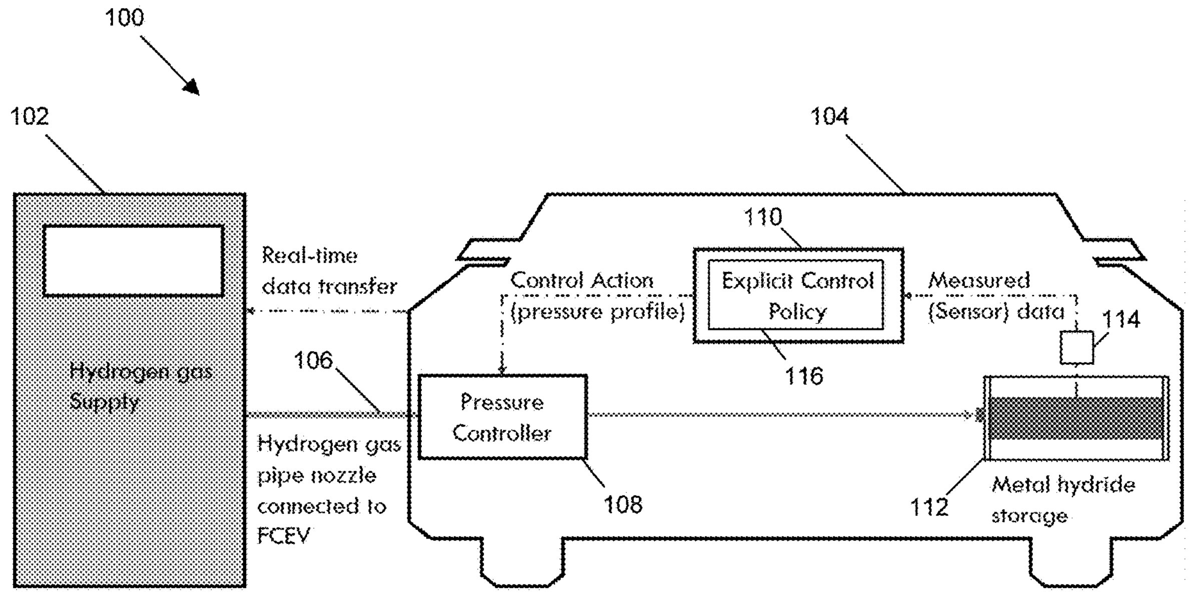
FIG. 1 is a schematic block diagram of an embodiment of a smart metal hydride refueling system in accordance with principles described herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the terms "couple", "coupled" or "couples" is intended to mean either an indirect or direct connection. Thus, if a first device couples to a second device, that connection may be through a direct connection of the two devices, or through an indirect connection that is established via other devices, components, nodes, and/or connections.

Embodiments described herein include optimization and control techniques for developing a thermal management strategy for hydrogen storage in a metal hydride storage system (MHSS). In an example, an explicit model predictive control (MPC) policy or operating strategy is a parametric control algorithm that is deployed in a controller for controlling one or more controllable parameters of MHSS during the refilling operation of a MHSS considering thermodynamic and operational constraints. The deploying process involves embedding the control strategies into the MHSS as a standalone smart system.

The present disclosure provides a comprehensive parametric optimization and control framework for the systematic design and off-line validation and testing of multi-parametric programming and robust explicit MPC. The framework includes development of a detailed "high-fidelity" mathematical model of a refilling process of a metal hydride, development of a reduced-order/approximating model suitable for explicit MPC design, design of a robust explicit MPC controller with the parametric control algorithm implementing the explicit MPC policy, implementation and validation/testing of the designed controller on the "high-fidelity" model, and experimental testing for validating the high-fidelity model and testing a real-time application of the explicit MPC controller.

In an embodiment, a smart MH refueling system (SMHRS) includes a FCEV with a controller embedded with the explicit MPC control policy for controlling one or more controllable parameters during the refueling process of FCEV to meet the refilling targets of the DOE. The explicit MPC control policy is a parametric control algorithm, which is unique to the type of metal hydride material and storage canister of a metal hydride storage system that is used in a FCEV. In an embodiment, a controllable parameter is the refilling pressure of hydrogen to a metal hydride fuel cell in FCEV that optimizes the filling pressure profile within the control horizon such that the temperature and other constraint are not violated. The refilling pressure profile may be predetermined ramp rates of the pressure to meet the refueling requirements of the DOE. The SMHRS integrates the explicit MPC policy within a metal hydride storage system. The SMHRS employs optimization techniques and obtains optimal control actions at multiple sampling time periods during the refueling process. Using strategically installed sensors, the SMHRS measures the measurable parameters of the metal hydride storage system at every sampling time and calculates the control action at each sampling time from the explicit MPC control policy.

Referring now to the figures, FIG. 1 is a schematic block diagram of an embodiment of a smart metal hydride refueling system (SMHRS) 100 in accordance with the principles described herein. In this embodiment, SMHRS 100 integrates an explicit model predictive control (MPC) policy in a metal hydride storage system (MHSS) to implement a smart hydrogen storage protocol. For instance, the smart hydrogen storage protocol is an intelligent parametric control algorithm that identifies a control action for a refilling pressure profile and dynamically controls in real-time one or more controllable process variables of the hydrogen gas in order to perform a fast refill operation on the MHSS in a FCEV in order to meet DOE targets. The hydrogen gas is supplied from a hydrogen gas station. These DOE targets specify a refilling pressure and filling rate, and continually adjust the refilling pressure at several sampling time periods during the refueling operation of MHSS of FCEV 104. In an embodiment, samples are obtained every 1 second. In embodiments, the smart hydrogen storage protocol may be implemented by the hydrogen gas station or by the FCEV. For brevity, SMHRS 100 is described with the smart hydrogen storage protocol being implemented by the FCEV while all other aspects of the smart hydrogen storage protocol remain substantially the same in the FCEV or in hydrogen gas station.

As shown, SMHRS 100 includes hydrogen gas dispenser 102 and FCEV 104. Hydrogen gas dispenser 102 may include a hydrogen gas hose and nozzle 106. In general, hydrogen gas dispenser 102 represents a hydrogen gas station that can supply hydrogen gas to FCEV 104 during a refueling operation. As described herein, the refueling operation includes supplying hydrogen gas to MHSS 112 to hydride metal alloys and form metal hydrides (MH) within MHSS 112. During the refueling operation, hydrogen gas hose and nozzle 106 may be physically coupled to FCEV 104 to supply hydrogen gas under refilling pressure to FCEV 104. FCEV 104 is a hydrogen fuel cell vehicle that uses a hydrogen fuel cell to power an on-board electric motor (not shown). FCEV 104 may include an actuator 108, controller 110, MHSS 112, and sensors 114. MHSS 112 is a hydrogen storage canister having metal alloys that store hydrogen as metal hydrides (MH), which is also referred to as charged MH. In an example, the compound may be, for example, an intermetallic compound like Lanthanum Nickel ($LANi_5$) filled with hydrogen to form a MH. In embodiments, other intermetallic compounds, for example, Titanium Chromium alloy ($TiCr_2$), Titanium Ferro alloy (TiFe) and Magnesium Nickel alloy ($Mg_2Ni$) may also be used. In an embodiment, MHSS 112 may include a cooling jacket that circulates a coolant around MHSS 112 during refueling. MHSS 112 is coupled to sensors 114. Sensors 114 may include a pressure transducer that measures the pressure inside MHSS 112 and thermocouples that measure the temperature within MHSS 112. In embodiments, sensors 114 measure pressure and temperatures of MHSS 112 at several discrete time periods during the refueling operation. These measured temperature and pressure values are obtained on-line and in real-time during the refueling operation.

Controller 110 is electrically coupled to sensors 114 and actuator 108. In an embodiment, actuator 108 may be a pressure controller, coolant system, or the like. Controller 110 may receive the measured current temperature value and current pressure value from sensors 114 at each sampling time. Controller 110 is embedded with explicit model predicted control (MPC) policy 116 for providing a refilling pressure profile that controls a controllable variable during repeated sampling times of MHSS 112 and optimally refuel MHSS 112. The explicit MPC policy is a feedback control law that is stored in silico in controller 110, and includes control actions that are determined in real-time at every sampling time during the refueling operation using in silico control laws and real-time measurements. Although not discussed in detail in the disclosure, in an embodiment, explicit MPC policy 116 may also optimize hydrogen release from the MH in MHSS 112 for generating electricity to power on-board devices. The control actions are predetermined off-line and may be retrieved in real-time when refueling MHSS 112. In embodiments, control actions include refilling pressure of hydrogen based on a refilling pressure profile that is provided to MHSS 112 using a quantity of hydrogen in MHSS 112 at each sampling time. In embodiments, other control actions include a pressure ramp rate and/or a refilling rate of hydrogen in MHSS 112.

In an embodiment, controller 110 is embedded with estimated values of the state of charge (SoC) in MHSS 112 that are predetermined or precalculated offline. As used herein, SoC is a ratio of the actual quantity of hydrogen as MH to the capacity of MHSS 112 as a weight percentage (w/w or wt %). The quantity of hydrogen is estimated using real-time measurements and mathematical calculations. In embodiments, the estimated SoC may be calculated using a Kalman filter algorithm that estimates the quantity of hydrogen using models of the hydrogen storage canister of MHSS 112, temperature and pressures of MHSS 112 for a type of hydrogen storage canister, metal alloy compound that are used for MHSS 112, ideal gas law, and pressure-composition-temperature (PCT) isotherms for hydrogen. For instance, real-time measurements are measured values for current hydrogen pressure and current temperature in MHSS 112 at each sampling time of sensors 114. These real-time measurements are used to obtain an estimated quantity of hydrogen using off-line data that is predetermined. In an embodiment, the quantity of hydrogen, temperature of hydrogen, and hydrogen pressure is used to obtain control actions representing commands/instructions that define a refilling hydrogen pressure to MHSS 112 at each sampling time that is required to optimally store hydrogen in MHSS 112 at the fastest time to meet the DOE limits. Parametric control algorithm of controller 100 uses the current temperature value and current pressure value to obtain a volume of hydrogen gas and the state of charge of MHSS 112 at each sampling time. As used herein, state of charge (SoC) of MHSS 112 is the ratio of the actual quantity of hydrogen as MH to the capacity of the MHSS 112 in weight percentage (w/w or wt %).

In a refueling operation of MHSS 112, FCEV 104 is coupled to hydrogen gas dispenser 102 via hydrogen gas hose and nozzle 106. Upon selecting a refueling option on hydrogen gas dispenser 102, sensors 114 acquire measurable values, for example, values for a current pressure and a current temperature of MHSS 112 in real-time at an initial sampling time and additional sampling times. Controller 110 receives these measured values from sensors 114, and creates a parameter vector for comparing with a prestored solution space. The solution space represents all possible scenarios of solutions that are available for controlling MHSS 112. The controller 110 executes an algorithm to search the solution space with the parameter vector to obtain control actions that provide a refilling pressure profile. The control action may include controlling the pressure value and the ramp rates of pressure to match the refilling pressure profile in order to receive hydrogen gas from hydrogen gas dispenser 102 at the pressure and rates predetermined. For instance, MPC policy 116 uses the measured temperature and current pressure values from sensors 114 to obtain an estimated quantity of hydrogen in MHSS 112 using a Kalman filter algorithm. The estimated quantity is predetermined based on calculations performed offline. Microcontroller 110 uses the control actions to instruct hydrogen gas dispenser 102 to start delivering hydrogen gas through hydrogen hose and nozzle 106 and to instruct pressure controller to provide the hydrogen gas from hydrogen gas dispenser 102 at an initial refilling pressure at the start of the refueling operation. While the pressure controller sends the hydrogen to the MHSS 112, the temperature inside MHSS 112 may increase. As such, sensors 114 obtain additional pressure and temperature values at different discrete time periods during the refueling operation, and based on these additional temperature and pressure values at each discrete time period, the controller 110 may obtain corresponding control actions to instruct the actuator 108 to change the refilling pressure or the refilling pressure ramp rate during hydrogen gas delivery to MHSS 112.

Figure 2:
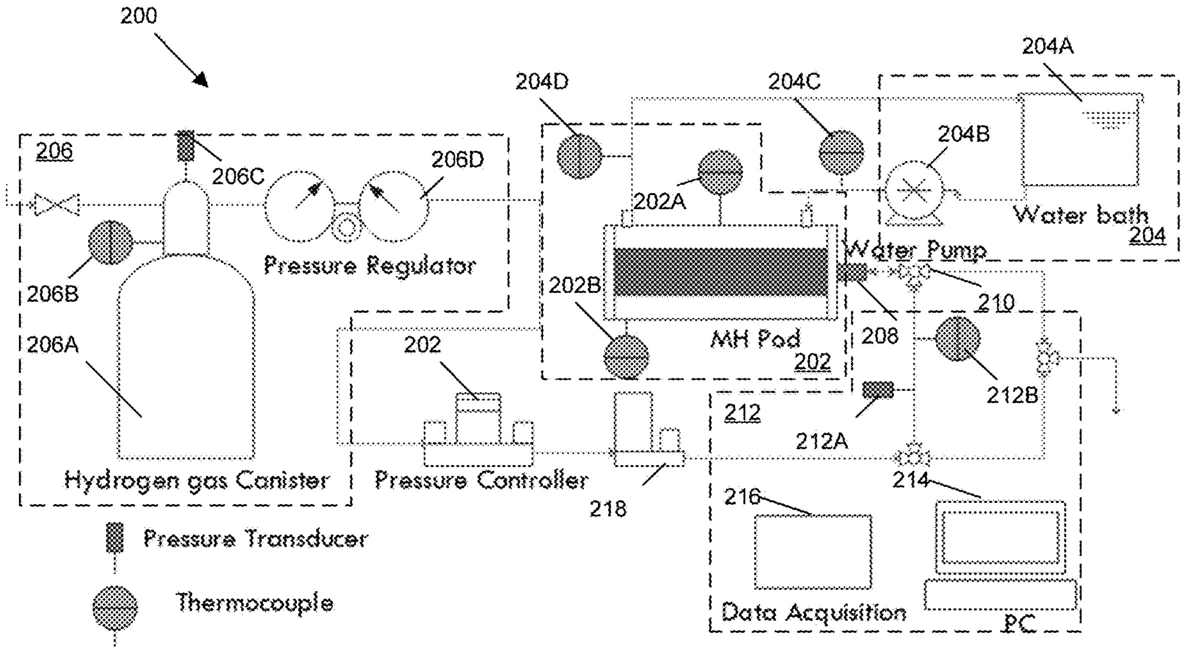
FIG. 2 is a schematic diagram of a laboratory scale prototype of the smart metal hydride refueling system of FIG. 1.

FIG. 2 is a schematic diagram of a laboratory scale prototype of a smart metal hydride refueling system 200 in accordance with various embodiments. For instance, SMHRS 200 replicates SMHRS 100 of FIG. 1 in order to acquire measurements to validate a high-fidelity model of a metal hydride fuel in SMHRS 200 and as a testbed for the real-time application of a smart hydrogen storage protocol for refueling a MH storage unit/pod.

As shown, SMHRS 200 comprises three main units: a MH storage unit 202, hydrogen supply unit 206 and power electronics unit 212. MH unit 202 has a MH pod 202 that is a MH reactor or canister encased by a cooling jacket (not shown). MH pod 202 represents FCEV 104 fitted with MHSS 112 as shown and described in FIG. 1. In embodiments, MH pod is a sealed 563.74 cubic centimeter ($cm^3$) made of stainless steel that contains 488 gram (g) of LaNi5 that may absorb approximately 6 g of hydrogen when used as a MH for hydrogen storage. MH pod 202 has thermocouples 202A and 202B inside MH pod 202 for measuring an internal temperature of MH pod 202. MH unit 202 is coupled to water bath 204A and water pump 204B. The cooling jacket surrounds MH pod 202 and receives water from water bath 204A via water pump 204B to enable cooling of MH pod 202 to an initial temperature and temperature control while performing the refilling operation. Water is used as the cooling and heating medium and it is supplied from a temperature controlled water bath 204A. Input thermocouple 204A and output thermocouple 204B are connected to the inlet and outlet of the cooling jacket to measure respective inlet and outlet temperatures. Pressure relief valve 210 is coupled to MH pod 202. Pressure relief valve 210 may be selectively opened to release excess pressure. SMHRS 200 may be controlled using a control protocol that is similar to MPC policy 116 (FIG. 1) in order to validate optimized refueling of MH pod 202 with hydrogen from hydrogen supply unit 206. A discharge valve 208 is coupled to MH pod 202 to release hydrogen from MH pod 202.

Hydrogen supply unit 202 comprises a hydrogen gas canister 206A fitted with a thermocouple 206B, a pressure transducer 206C, and a two-stage pressure regulator 206D. Hydrogen gas canister 206A has a 1700 $cm^3$ volume that is filled with hydrogen up to 6.9 Mega Pascal (MPa) and can withstand pressures as high as 17.2 MPa. Pressure regulator 206D is coupled to an electronic pressure controller 202 which is connected to MH pod 202.

Power electronics unit 212 includes data acquisition (DAQ) system 216 and a computer 214. DAQ system includes a universal serial bus (USB) thermocouple system 212B and input/output (I/O) device 212A. USB thermocouple system 212B provides thermocouple data from thermocouples 202A and 202B to computer 214. I/O device 212A acquires pressure data and implements the explicit MPC policy 116 on MH unit 202 through pressure controller 202 and water pump 204B. I/O device 218 is a hydrogen mass flow sensor to measure the flow rate of hydrogen provided to MH unit 202. In embodiments, USB thermocouple system 212B may be available from MicroDAQ.com and I/O device 212A may be a myRIO-1900 reconfigurable I/O device available from National Instruments®. DAQ system 216 is connected to computer 214 for data analysis, visualization, and optimization.

The refueling operation is performed by SMHRS 200 in order replicate a filling operation of MH pod 202 with hydrogen from hydrogen gas canister 202. Initially, a discharge operation is performed to discharge hydrogen from MH pod 202 by opening the discharge valve 208 for 20 minutes (min.) to ensure most of the hydrogen gas has been discharged. Next, and initialization operation is performed by closing discharge valve 208 of MH pod 202 and pumping water at 273 Kelvin (K) or 295 K through the cooling jacket. Pumping cooling water brings the core temperature of MH pod 202 to the cooling jacket temperature. The discharge and initialization operations bring the MH pod to an initial state where the core temperature cooling jacket of MH pod 202 is 273 K or 295 K and the MH pod pressure is 101.4 kilo pascal (kPa). In the initial state, the MH pod 202 has a very small amount of hydrogen gas in it. In the refueling operation, hydrogen gas canister 206A is filled with hydrogen to 6.9 MPa at 295 K (ambient temperature), and cooling water at a specific temperature is pumped through the cooling jacket at a constant flow rate. The pressure of the inlet (refilling pressure to MH pod 202) is set and the valve is opened. Next, the temperature data is acquired using DAQ system 216. The hydrogen content in MH pod 202 is an estimated value based on the volume of hydrogen that leaves hydrogen gas canister 206A, which is calculated based on the temperature and refilling pressure profile and the gas law.

Figure 3A:
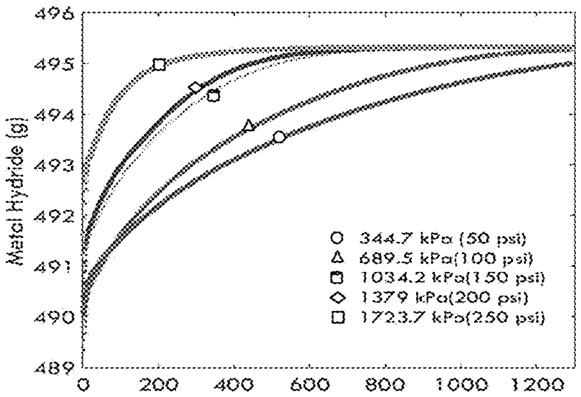
FIG. 3A depicts time profiles for a refueling operation performed by the laboratory scale prototype of FIG. 2.
Figure 3B:
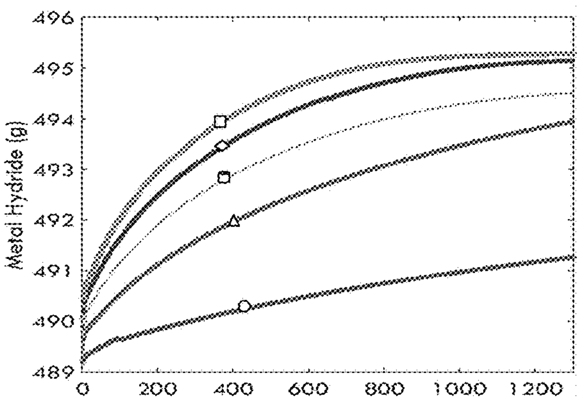
FIG. 3B depicts time profiles for a refueling operation performed by the laboratory scale prototype of FIG. 2.
Figure 3C:
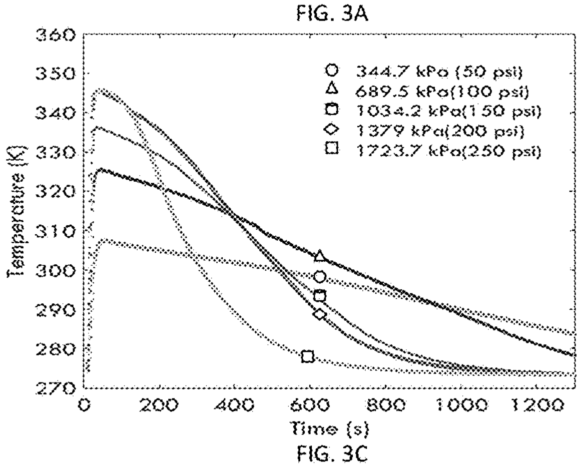
FIG. 3C depicts time profiles for a refueling operation performed by the laboratory scale prototype of FIG. 2.
Figure 3D:
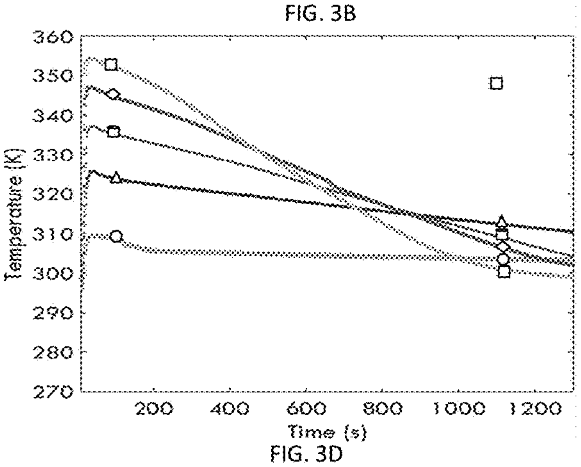
FIG. 3D depicts time profiles for a refueling operation performed by the laboratory scale prototype of FIG. 2.

FIGS. 3A-3D depict time profiles for a refueling operation performed by the laboratory scale prototype of FIG. 2 in accordance with various embodiments. Specifically, FIGS. 3A and 3B are time profile for the state of charge of hydrogen pod 202 for two respective coolant temperatures while performing a refueling operating in SMHRS 200, and FIGS. 3C and 3D are time profile for the temperature of hydrogen pod 202 for two respective coolant temperatures while performing the refueling operating in SMHRS 200. The refueling operation is a batch process and the inherent temperature profile of the batch operation has a shape of a positively skewed distribution function. As observed, during the first half of the process, there is a surge in the operating temperature to a maximum value that is dependent on the operating pressure. Attaining a higher maximum temperature increases the possibility for a hot spot and temperature runaway. During the second half of the operation, as the SoC of MH pod 202 attains a capacity, the operating temperature starts to decay. FIG. 3A shows a MH formation profile for five different refilling pressures starting from 344.7 kPa, for example, refill pressures of 344.7 kPa, 689.5 kPa, 1034.2 kPa, 1379 kPa and 1,723.7 kPa with 344.7 kPa increments at 273 K, and FIG. 3C shows a corresponding temperature profile at the 273 K coolant temperature. FIG. 3B shows a MH formation profile for five different refill pressures starting from 344.7 kPa with 344.7 kPa increments at 298 K coolant temperature, and FIG. 3D shows a corresponding temperature profile at the 298 K coolant temperatures, respectively. In FIGS. 3A and 3B, the refueling rate reduces with increasing pressure and the refueling rate increases with decreasing coolant temperature. In FIGS. 3C and 3D, the temperature increases with increasing pressure and as expected, the heat removal is faster with lower coolant temperature. Thus, there is a faster hydrogen uptake at higher refilling pressure and lower coolant temperature. In FIGS. 3A and 3B, at a coolant temperature of 273 K and hydrogen inlet pressure of 1,723.7 kPa, MH pod 202 reaches 95% charge (with 5.7 g of hydrogen) in less than 4 minutes and the operating temperature is less than 85 deg. C. (358 K) that is set as a target operating temperature by the DOE during refueling.

Figure 4:
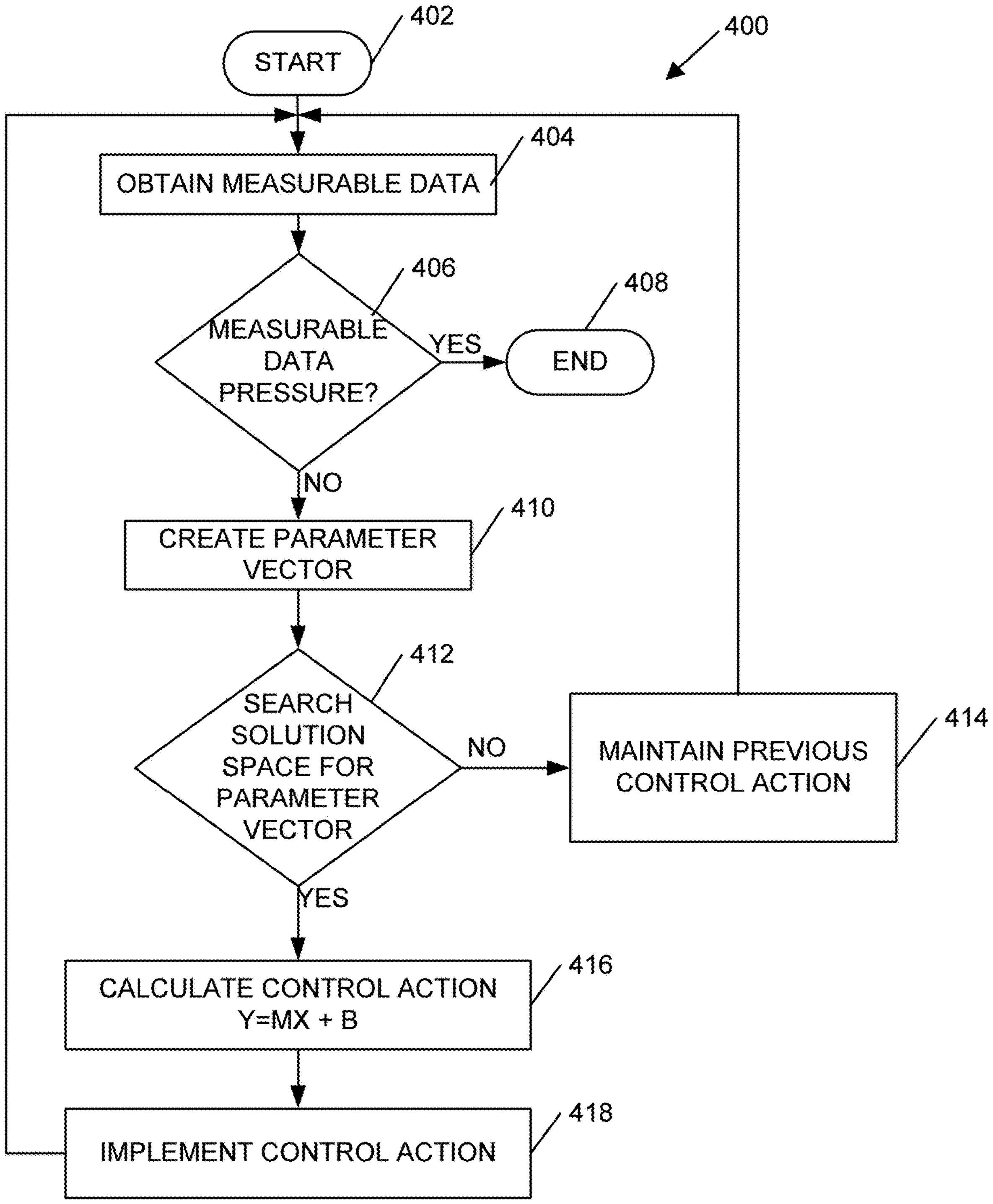
FIG. 4 is a flow chart illustrating an embodiment of method for refueling a metal hydride storage system in accordance with the principles described herein.

FIG. 4 is a flow chart of a method 400 for refueling an MHSS in a FCEV in accordance with various embodiments. Method 400 illustrates a parametric control algorithm implemented by an embedded explicit MPC policy for controlling one or more controllable process variables of MHSS during refueling. For instance, the process variables may be refilling pressure of hydrogen, ramp rate of hydrogen, and cooling temperature of a MH pod in an on-board MHSS of a FCEV. In an embodiment, the explicit MPC policy may be performed by an explicit MPC controller that is embedded with the explicit MPC policy. The explicit MPC policy is a feedback control law that performs an iterative process of performing a control action that follows a refueling profile stored in memory during a refueling operation of MH pod when the FCEV is coupled by a hose to a hydrogen gas supply at a hydrogen gas station. In an embodiment, FCEV may be FCEV 104 (FIG. 1).

Method 400 starts at block 402. At block 404, measurable data is obtained from the on-board MHSS. For instance, sensors in the FCEV measure, in real-time, hydrogen pressure and temperature of a hydrogen storage canister of the MHSS at an initial sampling time period. In an embodiment, sensors may sample pressure and temperature values every 1 second. The sensors pass this measured pressure and temperature data to the controller.

At block 406, controller determines whether the measured pressure data indicates a zero pressure in MHSS. A zero pressure may indicate the MHSS is completely charged (state of charge is approximately 100% by weight %). If the measured pressure data indicates zero pressure (block 406='YES'), the method 400 ends at block 408. If the measured pressure data does not indicate zero pressure (block 406='NO'), then at block 410, controller obtains a parameter vector. The parameter vector is an array of values (state of MH pod at each sampling time) that includes measured pressure, measured temperature and estimated SoC in the MHSS as wt %. The SoC of the MHSS is estimated using a Kalman filter algorithm that uses the temperature, pressure, and specifications of the MHSS including the size of the hydrogen gas canister and metal alloy used for the MHSS. In an example, a Kalman filter algorithm may be obtained in LabVIEW®. These estimated values may be stored offline in memory of the controller in a lookup table (L-T). In embodiments, the estimated SoC is an estimated value maps to stored SoC using the measured temperature and pressure. The parameter vector may be obtained at multiple sampling time periods as method 400 is repeatedly performed until the measured pressure is zero. Therefore, the parameter vector in a subsequent sampling time period may also include a control action that was identified and performed in an immediately preceding sampling time period.

At block 412, controller searches the memory for the parameter vector in a solution space stored in the memory to determine whether the parameter vector corresponds to the solution space. The solution space is predetermined offline and is a data structure corresponding to a plurality of feasible polyhedral critical regions (feasible states of parameter vectors). The parameter vector corresponds to a critical region in the solution space. A control action corresponds to a piecewise affine (PWA) function that satisfies a polyhedral critical region in the solution space. In an embodiment, a control action may be controlling a filling pressure to follow a refilling pressure profile obtained in a previous control action.

If the parameter vector does not correspond to the solution space (block 412='NO') or the parameter vector corresponds to the solution space and a control action for a PWA that corresponds to a critical region is same as a previous control action, then, at block 414, the controller maintains the previous control action by instructing the pressure controller to maintain the hydrogen pressure. In embodiments, the control action provides a refilling pressure that optimally matches the refilling profile.

However, at block 412, if the parameter vector corresponds to the solution space (block 412='YES'), then, at block 416, the controller obtains a control action. A control action may include a value for a refilling pressure for the MHSS. In other embodiments, the control action may include pressure ramp rate or changing a quantity of hydrogen supplied.

At block 418, controller implements the control action by sending instructions/commands to actuator 108. The instruction/commands may control the actuator to change one or more controlled parameters of the MHSS. Further, the control action may include a refilling profile, and the instructions/commands may be to control several controlled parameters. In an example, when the actuator is a pressure controller, a control action may cause a pressure controller to set a hydrogen pressure for the hydrogen that is supplied to MHSS. In an application scenario, the hydrogen gas canister may be fully depleted or partially depleted of hydrogen at a sampling time period, and a control action may be to maintain a high refiling pressure (controlled parameter) that hydrogen is supplied to MHSS based on the refueling profile and previous control actions. Further, if the temperature and pressure of the MHSS are high, increasing the refiling pressure may increase the temperature of the hydrogen in the MHSS. Therefore, a control action may be to set a lower pressure (controlled parameter) that hydrogen is supplied from hydrogen gas station to MHSS. While hydrogen is being supplied at the pressure determined by the control action, the pressure and temperature may change, and further control actions may include changing other parameters, for example, changing the refilling rate to maintain the controlled parameter.

Conversely, if the temperature of hydrogen in MHSS is lower than the optimal temperature for fast refilling of the hydrogen gas canister, the control action includes instructions/commands that control a pressure controller to set a hydrogen pressure for the hydrogen that is supplied from the hydrogen gas station at a higher pressure which increases its pressure and increases the fill rate of MHSS. In an embodiment, for a MHSS that includes a refrigeration unit with coolant for cooling the MHSS during the refueling operation, the control action may also include controlling the refrigeration unit that sets a flow rate of coolant through the refrigeration unit. After block 418, method 400 goes back to block 404. At block 404, current measurable data is obtained from the on-board MHSS, for example, current measurable data in real-time such as hydrogen pressure and temperature of a hydrogen storage canister of the MHSS at a subsequent sampling time period. Blocks 406 to 418 are iteratively performed for each and subsequent sampling time period until measure pressure indicates zero pressure (block 406='YES'), the method 400 ends at block 408.

Figure 5:
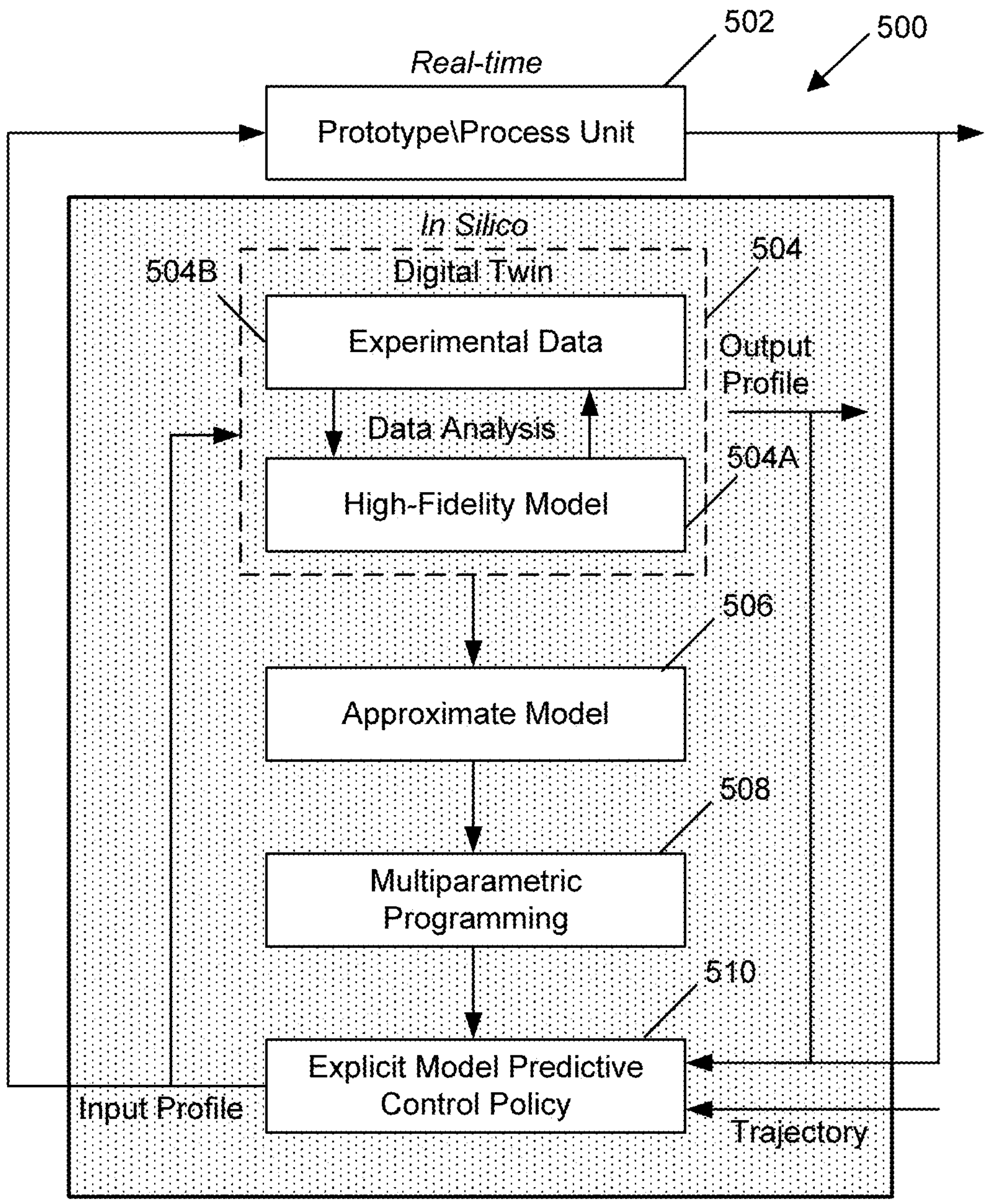
FIG. 5 is a diagram illustrating a parametric optimization and control framework in accordance with various embodiments.

FIG. 5 is a schematic diagram of a parametric optimization and control (PAROC) framework 500 in accordance with various embodiments. PAROC framework 500 is an integrated framework and software platform to obtain an explicit MPC policy to provide a feedback control policy for a refueling operation. PAROC 500 integrates an off-line high-fidelity model development of a MH fuel cell in a MHSS, approximation techniques and optimization-based strategies including multi-parametric programming to optimize the refilling operation of hydrogen in the MHSS. The explicit MPC policy embeds the feedback control policy on a controller using a multiparametric programming MPC-on-a-chip concept (explicit MPC-On-a-Chip) and uses experimental results to validate the high-fidelity model. An integrated PAROC framework is disclosed in "Pistikopoulos E. N., Diangelakis N. A., Oberdieck. R, Papathanasiou M. M., Nascu I., Sun M., PAROC—an integrated framework and software platform for the optimisation and advanced model-based control of process systems. *Chem Eng Sci.* 2015; 136:115-138" which is hereby incorporated by reference in its entirety. The explicit MPC policy may be explicit MPC policy 116 of FIG. 1. PAROC framework 500 includes both 'in silico' modeling design that is performed off-line and validation of a prototype MH system in a laboratory scale model such as, for example, SMHRS 200 that is performed in real-time.

PAROC framework 500 includes validation of an explicit MPC policy 502, high-fidelity modeling and analysis 504, approximate modeling 506, multiparametric programming 506, and explicit MPC policy 508. High-fidelity modeling and analysis 504 is a digital model of the real system and includes building a high-fidelity dynamic model 504A of a MH pod that is used for hydriding the LaNi5 in a MHSS and which represents the MH pods real operation. The high-fidelity dynamic model 504A simulates a digital copy of MH pod 202 (FIG. 2). The high-fidelity dynamic model 504A developed for MH pod 202 may be applied to other systems that use the same type of hydrogen storage device, the same type of a specific hydrogen material for its hydrogen storage at the metal hydride, with the same volume, and the filling of hydrogen in the metal as metal hydride. The hydriding model for the LaNi5 used is a physics-based lumped dynamic model that includes a mass and energy balance equation, a rate equation, and a variant of the Van't Hoff equation for the pressure concentration temperature (PCT) isotherm relation. The model may be developed in gPROMS® modelbuilder software that may be obtained from Process Systems Enterprise. In an embodiment, gPROMS® modelbuilder software is used to build and validate the hydriding model to obtain design simulation results that are similar to experimental results obtained from the laboratory scale prototype (FIG. 2). Next, the parameters of the model are adjusted to specifically fit the MH pod 202 that was shown and described in FIG. 2.

Mass Balance: The mass balance in the metal hydride is described by equation 1.

$$\frac{dm_{mh}}{dt} = rm_{sm} \tag{1}$$

where $m_{mh}$ is metal hydride mass, r is the reaction rate and $m_{sm}$ is the mass of a hydrogen saturated metal hydride. The hydrogen gas pressure in the MH pod is equal to the hydrogen supply pressure as specified by a pressure controller. Gas phase hydrogen accumulation in the free volume of the MH pod is assumed to be negligible.

Reaction Kinetics: Equation 2 describes the hydriding reaction as a function of the reaction temperature, the equilibrium pressure, the hydrogen supply pressure, and hydrogen content.

$$r = C_a \exp\left(\frac{E_a}{RT}\right)\ln\left(\frac{P_g}{P_{eq}}\right)\left(1 - \frac{m_{mh}}{m_{sm}}\right) \tag{2}$$

where $C_a$ is material depended constant, $m_{sm}$ and $m_{mh}$ are the mass of the solid phase at hydrogen capacity and actual content respectively. $P_{eq}$ and $P_g$ is the equilibrium pressure and the hydrogen inlet pressure respectively. R is the gas constant and T is the MH pod core temperature.

Energy Balance: The energy balance is described by equation 3.

$$m_s C_{mh}\frac{dT_{mh}}{dt} = \dot{Q}_w - \Delta H_{rxn} r\frac{m_{sm}}{M_{H_2}} \tag{3}$$

$\dot{Q}_w$ represents the heat removal, $$\Delta H_{rxn} r\frac{m_{sm}}{M_{H_2}}$$

is for the heat generated from the reaction, $C_{mh}$ is the effective heat capacity of the metal hydride, $T_{mh}$ is the temperature of the metal hydride core, $H_{rxn}$ is the heat of reaction, is the heat flow through the surface of the MH pod $M_{H2}$ is the molecular weight of hydrogen. The heat generated is removed through the wall of the MH pod by water convection in the cooling jacket as described in equation 4.

$$V\rho_w C_w\frac{dT_{mh}}{dt} = m_w C_w\left(T_w^{in} - T_w\right) - \dot{Q}_w \tag{4}$$

where $C_w$ is the heat capacity of the water, $T_w$ and $$T_w^{in}$$

are the temperature of jacket water or water leaving the jacket and the inlet water temperature respectively, V and ρ are the volume of the reactor jacket and the density of water respectively, $\dot{m}_w$ is the mass flowrate of water. The energy balance in the jacket is given by equation 5.

$$\dot{Q}_w = \epsilon A_s h_w(1-\phi)(T_w - T_{mh}) \tag{5}$$

where $A_s$ is the reactor surface area and $h_w$ is the heat transfer coefficient.

Equilibrium Pressure: Equation 6 describes the isotherm of the $LaNi_5$ material. The equilibrium pressure is related to the changes in enthalpy (ΔH) and entropy (ΔS), according to the Van't Hoff's equation.

$$P_{eq} = P_0\exp\left(\frac{\Delta H_{rxn}}{RT_{mh}} - \frac{\Delta S}{R} + a\tan\left[x\left(\frac{m_{mh}}{m_{sm}} - b\right) + c\right]\right) \tag{6}$$

where ΔS is the entropy change and ΔR is the gas constant.

Experimental data 504B acquired from MSHRS 200 may be used to tune the high-fidelity model 504A. Experimental data 504B includes measured variables that are acquired from the MH pod during cycles of hydriding the metal alloy in MH pod. The relevant measured variables are the operating temperatures of the core and the wall of the MH pod, the temperatures of water at inlet and outlet of the jacket, the temperature and pressure of the hydrogen reservoir canister, and the pressure of the MH pod. A distributed model would have captured different temperature profile at different node but validating a distributed model will require as many thermocouples as the nodes considered which will be more challenging and might result in a marginal improvement in the predictability of the original model. A simplifying assumption is to assume a single temperature profile for the MH pod. The data obtained from the experiment of the MSHRS 200 (FIG. 2) are processed using a software filter to remove the noise and outliers. The processed data is imported into gPROMS® modelbuilder software for parameter estimation. The parameter estimation performed in gPROMS® modelbuilder uses the maximum likelihood method as a criterion. The parameter estimation results in a nonlinear model representing a digital replica of the MH pod.

Figure 6:
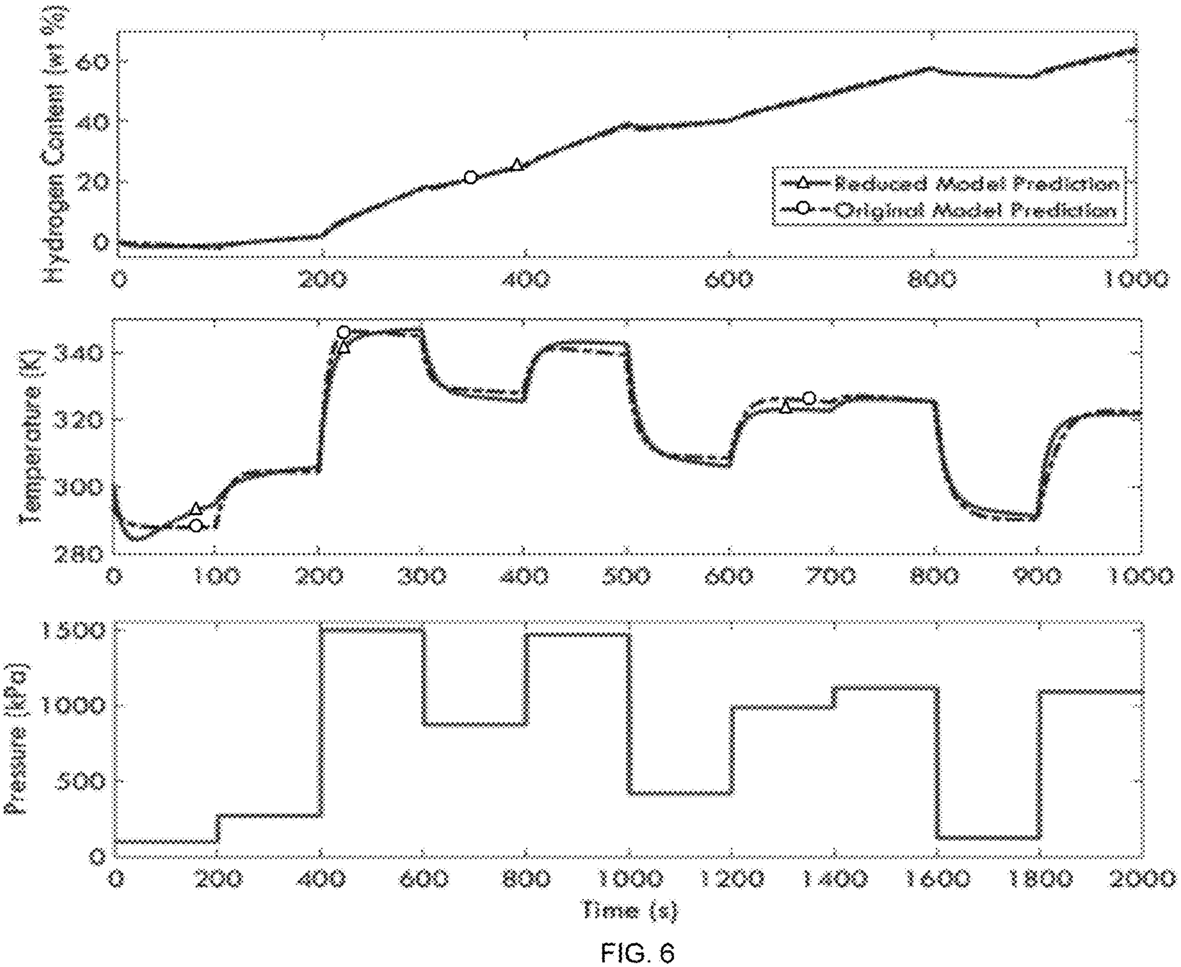
FIG. 6 illustrates a time profile for a high-fidelity model and a reduced model in accordance with various embodiments.

Approximate model 506 is used to reduce the high-fidelity model 504A to a linear discrete-time state space model that is suitable to formulate the MPC. Although, high fidelity model 504A is a simple approach to refilling MH pod, the size of the model and its non-linearity makes its use for optimization and control via multiparametric programming a challenging issue. So, model reduction techniques are applied. For a linear MPC, the model from the digital replica is reduced to a linear discrete-time state-space model. A series of simulations of the high-fidelity model 504A for different initial states may be used to construct a meaningful linear state-space model of the process using statistical methods. The System Identification Toolbox from MATLAB® may be used to reduce the model. The linear state space model generated is given in Equation 7 with a sampling time of 1 second (s). The accuracy of the reduced linear discrete-time state space model is determined by a fitting parameter value, which are 86.53 for the temperature and 98.11% for the filling profile curve. The MPC is formulated using equation 8 where an objective function is considered and minimized. FIG. 6 illustrates a filling time profile for the high-fidelity model 504A and the reduced linear discrete-time state space model for a temperature and a SoC of the MH pod. The linear discrete-time state space model captures most of the dynamics as shown in FIG. 6, its response to the perturbation of other variables such as the inlet coolant temperature was not considered. It is important to note that when reducing the non-linear high-fidelity model using the model reduction method, the states of the linear state-space model do not translate to the states of the original high-fidelity model 504A. Therefore, a Kalman filter is used as an observer to make this translation. The Kalman filter is also used to estimate the amount of hydrogen in the metal hydride pod.

$$x_{h+1} = \begin{bmatrix} 0.9999 & -1.295e^{4} & 4.287e^{-4} & -1.273e^{-5} \\ -2.895e^{-5} & 1 & -8.987e^{-3} & 1.176e^{4} \\ -6.672e^{-3} & -8.829e^{-3} & 0.9687 & -1.569e^{-2} \\ -3.38^{-3} & -1.491e^{-2} & -3.048e^{-2} & 0.9741 \end{bmatrix} x_k + \begin{bmatrix} 1.28e^{-8} \\ -1.008e^{-7} \\ 3.877e^{-5} \\ 4.632e^{-5} \end{bmatrix} u_k \tag{7}$$

$$y_k = \begin{bmatrix} 950.6 & 564.6 & 25.79 & -0.9191 \\ 199.2 & 6675 & 303.2 & -10.81 \end{bmatrix} x_k$$

$$\min_u J = \sum_{k=1}^{N-1} \left( (y_k - y_k^R)^T QR (y_k - y_k^R) \right) + \sum_{k=0}^{M-1} (\Delta u_k^T R \Delta u_k) \tag{8}$$

$$\begin{aligned} \text{s.t.}\quad s_{k+1} &= Ax_k + Bu_k \\ y_k &= Cx_k \\ u_{min} \le u_k &\le u_{max} \\ \Delta u_{min} \le \Delta u_k &\le \Delta u_{max} \\ x_{min} \le x_k &\le x_{max} \\ y_{min} \le yk &\le y_{max} \\ k &= 0, \ldots, M-1 \\ k &= 0, \ldots, M-1 \\ k &= 0, \ldots, N \\ k &= 0, \ldots, N \end{aligned}$$

where $x_k$ are the state variables; $u_k$ is the control variables; $u_k$ denotes the difference between two consecutive control actions; $y_k$ and $y^R_k$ are the outputs and their respective set points; R and QR are the corresponding weights in the quadratic objective function; N and M are the prediction horizon and control horizon, respectively; k is the time step; A, B, and C are matrices of the discrete linear state-space model. The discrete linear state-space model is used for multiparametric programming 508.

Multiparametric programming 508 is formulated to develop control policies that maintain the temperature of the hydriding operation below a certain threshold while maximizing the SoC. The control policy is an optimal for a MHSS to achieve the DOE targets if other design considerations are met. Control design considerations include manipulated variables such as the filling pressure and the water flow rate. During the hydriding process, an important objective is to remove as much heat as possible; thus, the water flow rate is set at maximum and therefore not include in the control design as a manipulated variable. Thus, the only control variable is the filling pressure. An alternative approach is to include the flow rate as a second manipulated variable which has the potential to increase the critical regions and will probably remain at the upper bound during the filling operation. However, during a discharge operation, the water flow rate becomes an indispensable manipulated variable. In the MHSS operation, there is a trade-off between the temperature, the pressure, and the filling rate. As described in FIG. 2 for the SMHRS 200, the higher the filling pressure, the faster the reaction rate (high filling rate) and the higher the maximum operating temperature. The MPC is formulated to optimize the filling pressure profile within the control horizon such that the temperature and other constraint are not violated and also that the output trajectory reaches or maintains the set points as much as possible. The set points used in the control strategy are based on a time invariant optimal trajectory obtained from a dynamic optimization of the original model. Using the linear discrete model developed in the Model reduction section, Equation 8 above is used to formulate a quadratic MPC optimization problem. The quadratic problem in Equation 8 can be reformulated into a multiparametric quadratic programming problem (mpQP) as shown in Equation 9 and solved using POP toolbox in MATLAB®. A solution using the POP toolbox in MATLAB is disclosed in Oberdieck R., Diangelakis N. A., Papathanasiou M. M., Nascu I., Pistikopoulos E. N. Pop-parametric optimization toolbox. *Industrial & Engineering Chemistry Research* 2016; 55 (33): 8979-8991, which is herein incorporated by reference in its entirety.

$$\begin{aligned} z(x) = \min_{u,\theta}\quad & u^T Hu + u^T F^T \theta \\ s.t.\quad & Gu \le W + S\theta \\ & u \in U \\ & \theta \in \Theta = \{\theta \in \mathbb{R}^q \mid CR_A\theta \le CR_b\} \end{aligned} \tag{9}$$

where H∈ $\mathbb{R}^{n\times n}$, F∈ $\mathbb{R}^{n\times q}$, G∈ $\mathbb{R}^{n\times m}$, W∈ $\mathbb{R}^{q}$, and S∈ $\mathbb{R}^{m\times q}$ are matrices, u is a vector that contain a sequence of control actions, n and q is the size of the control and parameter vector respectively, and consequently the size of the parametric solution and parametric space of the problem.

The bounds on the output variable u and y are set according to the dynamic model simulation results. However the bounds on x are exaggerated as the states of the linear state space model do not represent the state of the original high fidelity model 504A. The multi-parametric model predictive controller problem in equation 9 is solved using POP toolbox in MATLAB®, which is available from The MathWorks, Inc. The solution obtained is of the form u=f(θ), mapping the parameters e to a sequence of control actions u. f(θ) is a piece-wise affine (PWA) function of the uncertain parameters as shown below in equation 10. Equation 10 represents the explicit MPC feedback law. The uncertain parameters are denoted by θ and they include the initial states $x_0$, the output $y_k$ the set points $y^R_k$, and previous control actions u−1 for evaluating $\Delta u_k$.

$$f(\theta)=\begin{cases} a_1\theta+b_1 & \text{if } \theta\in CR_1; \\ \ldots & \ldots \\ a_m\theta+b_m & \text{if } \theta\in CR_m. \end{cases} \quad (10)$$

where $CR_i=\{\theta\in \mathbb{R}^q | X_i\theta\leq x_i\}$, i=1, . . . , $N_m$ are polyhedral critical regions defined by active sets.

The solution space for the mpQP obtained has 174 critical regions (i.e., m=174) defined by $X_i$, $x_i$, $a_i$, and $b_i$ matrices. Thus, at every sampling time, the parameter vector realized from measurements of the state and outputs is used as inputs to evaluate the PWA function. For the MH system, there are nine uncertain parameters measured at every sampling time. Critical regions are obtained and all but the previous input (filling pressure) and the SoC are fixed within the critical regions. The filling pressure in a selected critical region is the solution obtained based on evaluation the PWA that is feasible in a critical region. In an embodiment, a solution space is a data structure corresponding to a plurality of feasible polyhedral critical regions (feasible states of parameter vectors). A control action in the solution space is a PWA that satisfies a feasible state in the polyhedral critical region.

Figure 7:
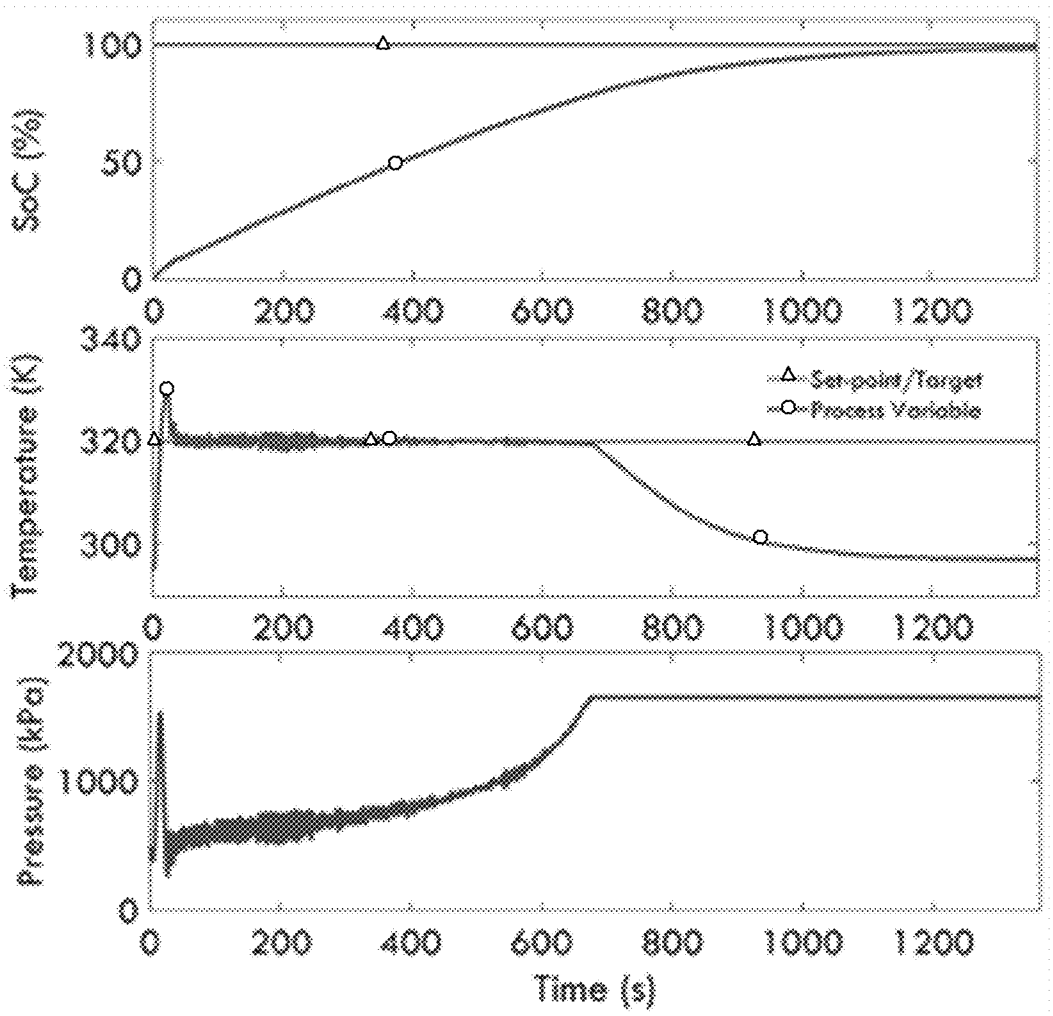
FIG. 7 illustrates a time profile for changes in process variables and set point targets in accordance with various embodiments.

Explicit MPC policy 510 defines feedback control laws, which is validated against the high-fidelity model using a controller. Hosting the high-fidelity model in gPROMS® and the feedback control policy in MATLAB®, and through a data exchange protocol provided by gOMATLAB, the controller is tested in a closed loop fashion. The result of the closed-loop validation is shown in FIG. 7, which shows the process variables and set point targets are temperature and SoC of the MH pod, and the manipulated variable is the filling pressure. The filling pressure profile represents the trajectory showing the sequence of optimal control actions required to keep the MH core temperature on the set point for most of the alpha-beta reaction phase while filling up the MH to 100%. As mentioned above in FIG. 2, the refueling of the MH system is a batch process, and the inherent temperature profile of the batch operation has the shape of a positively skewed distribution function. Thus, irrespective of the control strategy used, the temperature decays as the SoC of the MH pod approaches the maximum.

Figure 8:
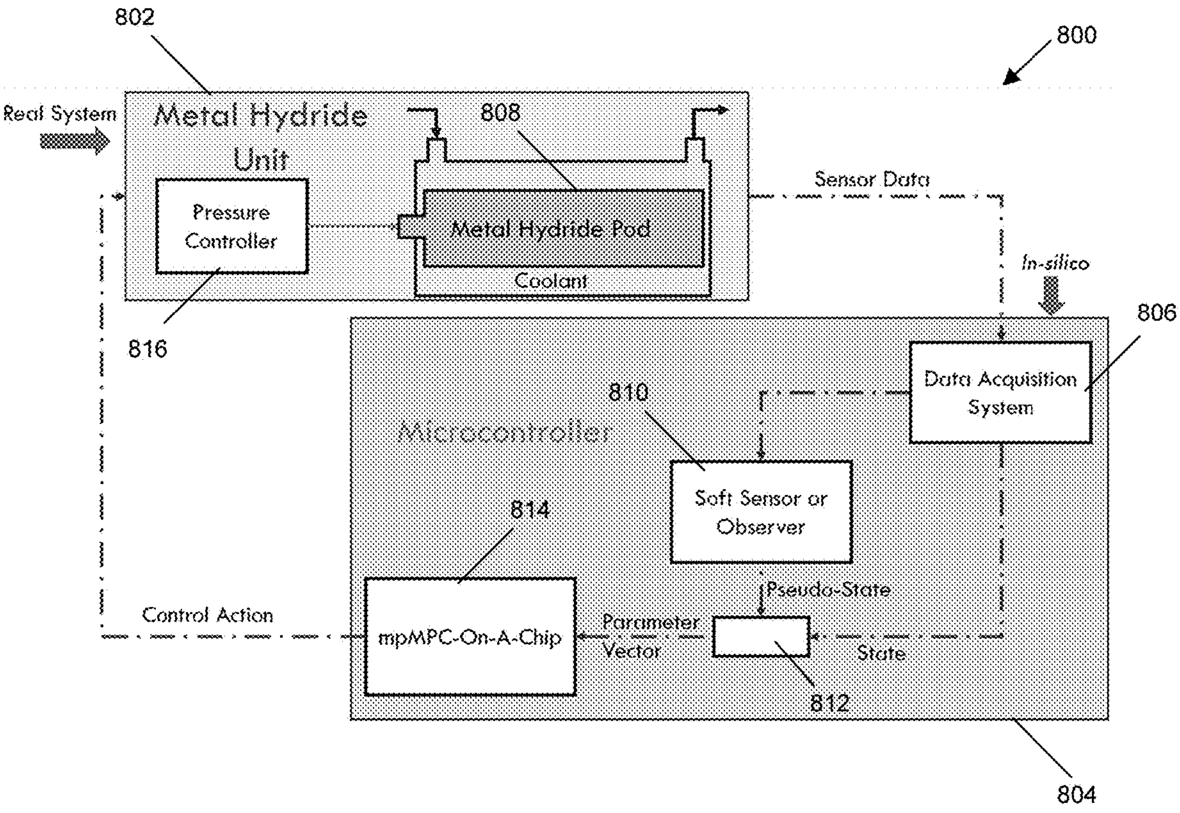
FIG. 8 is a schematic block diagram for validating a feedback control law in accordance with various embodiments.

With the feedback control law validated in silico, it is deployed in a controller (also referred to as explicit MPC-on-a-chip) and used for a real-time control of Prototype/process unit 502. FIG. 8 illustrates a block diagram 800 for validating the explicit MPC policy in accordance with various embodiments. The real-time application setup of the controller is done in LabVIEW® available from National Instruments®. Controller 804 may be used to implement the online evaluation for real-time control of MH unit 802 and includes the feedback control laws stored on controller 804 (explicit MPC-on-a-chip). MH unit 802 may be MH pod 202 (FIG. 2) and represents a real system that is controlled by storing hydrogen in MH unit 802. In an example, controller 804 may be a National Instrument portable reconfigurable I/O device myRIO-1900 having a Xilinx® Z-7010 dual-core processor, a fast programmable grid array (FPGA) type with speeds of 667 megahertz (MHz), and random access memory (RAM) of 256 megabyte (MB). The explicit feedback law is embedded into controller 804 such that the matrices ($X_i$, $x_i$, $a_i$, $b_i$) and that define the critical regions and the algorithm that defines the affine functions are stored in controller 804. The computational burden in implementing the explicit MPC feedback law is to identify the critical region for the parameter vector at every sampling time. While it is possible to exhaustively enumerate all the polytopes to find the region with the parameter vector, it may be computationally expensive for systems with larger number of critical regions. A goal is to use an efficient amount of computational expense and storage space. In an embodiment, a simple and common approach used sequential search to find a region with the parameter vector. The sequential search procedure also requires looping through the critical regions to identify the polytopes where the parameter vector lies at every sampling time as described by the point location algorithm that defines the critical regions for the parameter vector, shown below:

Obtain the parameter vector θ(t) measurements (pseudo-states outputs initial input).

While $i\leq N_m$ AND ¬Located do.

if all $\{X_i\theta-x_i\}\leq e$ then return Located=1, $u_i=a_i\theta+b_i$

Implement the $i^{th}$ control action:

The sequential search approach is used in this study since the feedback law obtained from the offline optimization has only 174 critical regions and looping through it takes less than 0.2 seconds. Also, the combined size of the matrices (in a text file) is less than 75 KB. In an embodiment, the online algorithm is implemented using a combination of mathscript and the virtual instrument in LabVIEW®.

As shown in FIG. 8, output data is obtained from Metal Hydride unit 802 and sent to Data Acquisition (DAQ) system 806 by sensors. In an example, DAQ system 806 may be implemented in software, for example, LabVIEW®. Sensor data from Metal Hydride pod 808 is sent to Controller 804 over several sampling times. Sensor data may include hydrogen pressure and temperature of Metal Hydride pod 808. During each sampling time, DAQ system 806 receives the sensor data and communicates the sensor data to soft sensor system 810. Soft sensor 810 may be software that implements a Kalman filter algorithm to obtain a pseudo-state of Metal Hydride pod 808. The pseudo-state may be an estimate of SoC. Temperature, hydrogen pressure, sampling time, and pseudo-state create the array of values for the parameter vector, which is obtained by parameter vector generator 812. Parameter vector generator may have instructions that obtain the array of values for the parameter vector. The parameter vector sent to explicit MPC-On-A-Chip unit 814. Explicit MPC-On-A-Chip unit 814 includes a parametric control algorithm with feedback control laws that are embedded into memory 814 and executed by a processor in explicit MPC-On-A-Chip module 814. Feedback control laws include the critical regions and PWA functions. The Explicit MPC-On-A-Chip unit 814 obtains a control action from the PWA function. The parameter vector is evaluated against the critical region to obtain a PWA function that is in a feasible critical region. PWA that is fixed within the critical region is used to retrieve a control action for a refilling pressure. Control action is sent as instructions to pressure controller 816 to control the refilling pressure of metal hydride pod 808.

Figure 9:
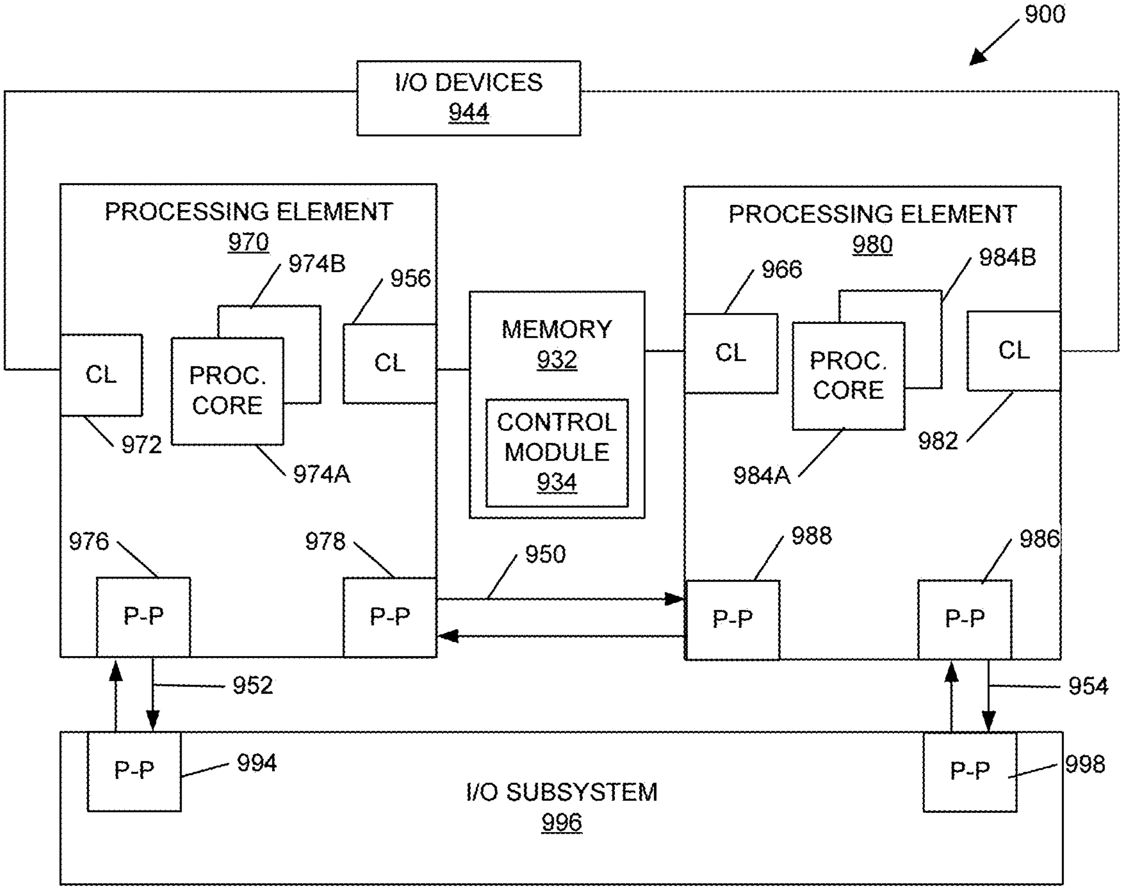
FIG. 9 is a schematic block diagram that illustrates a programmable device according to various embodiments

FIG. 9 is a block diagram that illustrates a programmable network device 900 according to various embodiments. Programmable device 800 may be controller 110 or controller 804 and includes processing elements 970 and 980. Each of the processing elements 970 and 980 may be multicore processors, including first and second processor cores (i.e., processor cores 974A and 974B and processor cores 984A and 984B). Such cores 974A, 974B, 984A, and 984B may be configured to execute instruction code in a manner similar to that discussed above in connection with FIGS. 1-8. However, other embodiments may use processing elements that are single core processors as desired. In embodiments, with multiple processing elements 970 and 980, each processing element may be implemented with different numbers of cores as desired. Alternatively, one or more of processing elements 970, 980 may be an element other than a processor, such as a graphics processing unit (GPU), a digital signal processing (DSP) unit, a field programmable gate array, or any other programmable processing element. Processing element 970 may be heterogeneous or asymmetric to processing element 980. There may be a variety of differences between processing elements 970, 980 in terms of a spectrum of metrics of merit including architectural, microarchitectural, thermal, power consumption characteristics and the like. These differences may effectively manifest themselves as asymmetry and heterogeneity amongst processing elements 970, 980. In some embodiments, the various processing elements 970, 980 may reside in the same die package as a system on chip (SoC).

First processing element 970 may further include memory controller logic (CL) 672 and point-to-point (P-P) interconnects 976 and 978. Similarly, second processing element 980 may include a CL 982 and P-P interconnects 988 and 986. P-P interconnects 956 and 966 couple processing elements 970 and 980 to a memory 932. Control module 934 implements the disclosed embodiments for controlling refueling as described in the embodiments above. For instance, the control module 934 implements, processes, prepares, or provides the various controlling operations and control actions. The inclusion of the control module 934 therefore provides a substantial improvement to the functionality of the network device 900 and effects the programmable network device 900 to a different state. Alternatively, the control module 934 is implemented as instructions stored in the memory 932 and executed by processing elements 970 and 980. FIG. 9 illustrates that I/O device 944 may be coupled to the CL 972, 982. While CL logic 972 and 982 is illustrated as integrated into processing elements 970, 980, in some embodiments the controller logic may be discrete logic outside processing elements 970, 980 rather than integrated therein. Processing element 970 and processing element 980 may be coupled to an I/O subsystem 990 via respective P-P interconnects 976 and 986 through links 952 and 954. As illustrated in FIG. 9, I/O subsystem 990 includes P-P interconnects 994 and 998. Various components of programmable device 900 may be combined in a system-on-a-chip (SoC) architecture.

While the embodiments have been shown and described, modifications thereof can be made by one skilled in the art without departing from the scope or teachings herein. The embodiments described herein are exemplary only and are not limiting. Many variations and modifications of the systems, apparatus and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A controller for refueling a fuel cell, comprising:

a data acquisition system configured to:

receive, in a first sampling time period, sensor data of a hydrogen storage unit of a metal hydride storage system (MHSS), and generate, based on the sensor data, first data corresponding to a state of charge (SoC) of the hydrogen storage unit;

a soft sensor system communicatively coupled to the data acquisition system and configured to:

receive the first data; and generate second data based on the first data, wherein the second data corresponds to a pseudo state of the MHSS based on the first data;

a parameter vector generator coupled to the soft sensor system and configured to generate a parameter vector of a plurality of parameter vectors, wherein the parameter vector comprises the first data and the second data; and a multi-parametric (mp) model predictive controller (mpMPC) communicatively coupled to the parameter vector generator and configured to:

search, using the parameter vector, a first data structure, wherein the first data structure corresponds to a plurality of polyhedral critical regions, wherein the plurality of polyhedral critical regions correspond to feasible states of the plurality of parameter vectors;

select, based on the search, a first critical region of the plurality of polyhedral critical regions, wherein the first critical region corresponds to the parameter vector;

select, from a second data structure, a first piecewise affine function of a plurality of piecewise affine functions, wherein the first piecewise affine function corresponds to the first critical region, and wherein the plurality of piecewise affine functions correspond to different control actions for the plurality of polyhedral critical regions; and obtain a first control action based on the first piecewise affine function; and send the first control action to the MHSS for controlling refueling of the MHSS.

2. The controller of claim 1, further comprising a memory configured to:

store the first data structure corresponding to the plurality of polyhedral critical regions; and store the second data structure corresponding to the plurality of piecewise affine functions.

3. The controller of claim 1, wherein the mpMPC implements an explicit multi-parametric model predictive control policy computed offline via multi-parametric programming, and wherein the mpMPC is further configured to control a controlled parameter of the MHSS using one of the different control actions.

4. The controller of claim 3, wherein the mpMPC is further configured to:

receive, in a second sampling time period, second sensor data of the hydrogen storage unit from the parameter vector generator; and send a second control action to the MHSS when the second sensor data indicates an optimal refilling profile for the MHSS, wherein the second control action maintains the first control action at the MHSS.

5. The controller of claim 1 wherein the pseudo state of the MHSS corresponds to an estimate of the SoC of the MHSS, and wherein the soft sensor system is configured to estimate the SoC based on a look up table.

6. The controller of claim 5, wherein the second data comprises a real-time pressure of the MHSS and a real-time temperature of the MHSS.

7. The controller of claim 5, wherein the mpMPC is further configured to send the first control action to a pressure controller for instructing the MHSS to control a refilling pressure of hydrogen at the MHSS.

8. The controller of claim 1, wherein the data acquisition system is further configured to receive the sensor data of the MHSS when the MHSS has a positive pressure.

9. The controller of claim 1, wherein the parameter vector generator is configured to generate the parameter vector after the MHSS is coupled to a hydrogen gas supply.

10. The controller of claim 1, wherein the soft sensor system is further configured to estimate the pseudo state of the MHSS using a Kalman filter algorithm.

11. A method, comprising:

receiving, in a first sampling time period, sensor data of a hydrogen storage unit of a metal hydride storage system (MHSS);

generating, based on the sensor data, first data corresponding to a state of charge (SoC) of the hydrogen storage unit;

obtaining second data based on the first data, wherein the second data corresponds to a pseudo state of the MHSS based on the first data;

generating a parameter vector of a plurality of parameter vectors and comprising the first data and the second data;

searching, using the parameter vector, a first data structure;

selecting, based on searching the first data structure, a first critical region of a plurality of polyhedral critical regions, wherein the first critical region corresponds to the parameter vector;

selecting, from a second data structure, a first piecewise affine function of a plurality of piecewise affine functions, wherein the first piecewise affine function corresponds to the first critical region, and wherein the plurality of piecewise affine functions correspond to different control actions for the plurality of polyhedral critical regions;

obtaining a first control action based on the first piecewise affine function; and sending the first control action to the MHSS for controlling refueling of the MHSS.

12. The method of claim 11, further comprising:

storing the first data structure corresponding to the plurality of polyhedral critical regions, wherein the plurality of polyhedral critical regions correspond to feasible states of the plurality of parameter vectors; and storing the second data structure corresponding to the plurality of piecewise affine functions.

13. The method of claim 11, further comprising controlling a controlled parameter of the MHSS using one of the different control actions.

14. The method of claim 13, further comprising:

receiving, in a second sampling time period, second sensor data of the hydrogen storage unit; and sending a second control action to the MHSS when the second sensor data indicates an optimal refilling profile for the MHSS, wherein the second control action maintains the first control action at the MHSS.

15. The method of claim 11 wherein the pseudo state of the MHSS corresponds to an estimate of the SoC of the MHSS, and wherein the method further comprises estimating the SoC based on a look up table.

16. The method of claim 15, wherein the second data comprises a real-time pressure of the MHSS and a real-time temperature of the MHSS.

17. The method of claim 15, further comprising sending the first control action to a pressure controller for instructing the MHSS to control a refilling pressure of hydrogen at the MHSS.

18. The method of claim 11, further comprising receiving the sensor data of the MHSS while the MHSS has a positive pressure.

19. The method of claim 11, further comprising generating the parameter vector after the MHSS is coupled to a hydrogen gas supply.

20. The method of claim 11, further comprising estimating the pseudo state of the MHSS using a Kalman filter algorithm.

* * * * *